(12) United States Patent
Leschuk

(10) Patent No.: US 12,253,147 B2
(45) Date of Patent: Mar. 18, 2025

(54) LOW INERTIA HYDRODYNAMIC LAUNCH DEVICE

(71) Applicant: EXEDY GLOBALPARTS CORPORATION, Belleville, MI (US)

(72) Inventor: Daniel Leschuk, Chelsea, MI (US)

(73) Assignee: Exedy GlobalParts Corporation, Belleville, MI (US)

( * ) Notice: Subject to any disclaimer, the term of this patent is extended or adjusted under 35 U.S.C. 154(b) by 0 days.

(21) Appl. No.: 18/312,403

(22) Filed: May 4, 2023

(65) Prior Publication Data

US 2023/0358283 A1    Nov. 9, 2023

Related U.S. Application Data

(60) Provisional application No. 63/338,209, filed on May 4, 2022.

(51) Int. Cl.
  *F16H 45/02*  (2006.01)
  *F16H 41/24*  (2006.01)
  *F16H 45/00*  (2006.01)

(52) U.S. Cl.
  CPC ......... *F16H 45/02* (2013.01); *F16D 2300/26* (2013.01); *F16H 2041/246* (2013.01); *F16H 2045/002* (2013.01)

(58) Field of Classification Search
  CPC ........... F16D 2041/246; F16D 2300/26; F16H 57/02–039; F16H 2045/002–005; F16H 45/02–2045/0215; F16H 2045/0273–0294; B60K 6/405; B60K 2006/4825
  See application file for complete search history.

(56) References Cited

U.S. PATENT DOCUMENTS

| | | | |
|---|---|---|---|
| 6,564,914 B1* | 5/2003 | Glock | F16H 45/02 29/469 |
| 9,086,126 B2* | 7/2015 | Frait | B60K 6/26 |
| 11,815,167 B2* | 11/2023 | Glade | B60K 6/405 |
| 2019/0305698 A1* | 10/2019 | Matsuoka | H02P 3/14 |
| 2023/0167887 A1* | 6/2023 | Lee | B60K 17/02 180/65.6 |

* cited by examiner

*Primary Examiner* — James J Taylor, II
(74) *Attorney, Agent, or Firm* — Honigman LLP; Eric J. Sosenko; Jonathan P. O'Brien

(57) ABSTRACT

A launch device for coupling the rotary output of a prime mover to the rotary input of a driven device. The launch device includes a containment vessel defining a chamber. A driving element, located within the chamber and being rotatable relative to the containment vessel, is configured to be coupled to the output of the prime mover, while a driven element, also located within the chamber and being rotatable relative to the containment vessel, is configured to be coupled to the input of the driven device. The driven element is fluidically coupled to the driving element and is rotationally driven thereby during rotation of the driving element by the prime mover.

12 Claims, 3 Drawing Sheets

LOW INERTIA HYDRODYNAMIC LAUNCH DEVICE

BACKGROUND

1. Field of the Invention

The present invention generally relates to driveline elements. More specifically, the present invention relates to a hydrodynamic launch device that allows for a reduction in the rotational inertia of the powertrain system.

2. Description of Related Art

Fluid couplings, such as a torque converter, are a known technology that have been used extensively throughout the last century. In a simplistic description, a torque converter uses a hydrodynamic circuit to multiply an input torque and transmit the increased torque as an output torque to a driven that is to be driven. Conventional torque converters are connected to a device that generates torque, for example a prime mover such as an internal combustion engine or/and an electric motor, and transfer the torque to a transmission or other device to be driven by the prime mover.

Generally, a torque converter includes a front cover and a rear cover, which together define a shell having an internal chamber where the hydrodynamic circuit is provided. Generally, the output of the prime mover causes rotation of the shell. Rotation of the shell in turn causes rotation of an impeller within the shell. Resultantly, rotation of the impeller directs a hydrodynamic fluid outward and toward a turbine, where the force imparted on the turbine by the fluid rotationally drives the turbine. From the turbine, the fluid is directed radially inward and subsequently axially back toward the impeller. A stator, positioned between the turbine and the impeller, further redirects the fluid to efficiently transfer the fluid back to the impeller, thereby multiplying the torque being transferred. Because this circuit is hydrodynamic, a speed differential (known as slip) can occur between the input (impeller) and the output (turbine) sides of the torque converter. In certain instances, slip is desirable.

As noted above, the shell is connected to the output of the prime mover and functions as the rotational input of the torque converter. The method of connecting the torque converter to the prime mover may include an intermediary element, such as a flex plate, which is attached to the crankshaft or motor shaft of the prime mover. In addition to being the attachment mechanism, the flex plate functions to accommodate dynamic expansion of the torque converter's shell, known as "ballooning," caused by the rotational speeds and hydraulic pressure within the torque converter.

Torque converters, and fluid couplings in general, have inherent losses due to a variety of factors, including fluid friction, cavitation, leakage across gaps and other reasons. One such inherent loss is a result of the primary inertia of the driveline.

Being directly connected to the prime mover, the flex plate and the torque converter shell add to the primary inertia of the driveline. The primary inertia imposes a resistance to rotational acceleration of the driving elements and, therefore, has a direct, negative effect on the overall efficiency of the powertrain system.

If the primary inertia can be decreased, fuel economy and/or electric motor system efficiency may be increased and improved.

Conventional torque converters have high primary rotational inertia due to the mass of the shell and its direct connection to the driving elements of the powertrain. While it may be made of an aluminum alloy or a composite, the shell of a torque converter is typically constructed of thick steel. The steel construction is beneficial in that it also facilitates high volume production and mitigates the effects of ballooning, along with its resultant increase in the axial package length of the torque converter.

SUMMARY

In satisfying the above need, as well as overcoming the enumerated drawbacks and other limitations of the related art, the present invention provides a launch device whose construction decreases the primary inertia of a driveline compared to one utilizing a conventional torque converter. By reducing primary inertia, increases in fuel economy, efficiency and powertrain response will be evident.

The above is achieved, in part, by eliminating the conventional rotating torque converter shell and replacing it with a fixed baffle structure that is not subject to the physical effects that result in high primary inertia and the forces that cause ballooning.

In one aspect, the invention provides launch device for coupling the rotary output of a prime mover to the rotary input of a driven device.

In another aspect, the invention provides a launch device that includes a containment vessel having a front cover and a rear cover, which cooperate to define a chamber; a driving element located within the chamber and configured to be coupled to the output of the prime mover and rotatable relative to the containment vessel; a driven element located within the chamber and configured to be coupled to the input of the device to be driven and rotatable relative to the containment vessel. The driven element is fluidically coupled to the driving element and is rotationally driven thereby during rotation of the driving element by the prime mover.

In another aspect, the driving element is an impeller having a series of impeller blades and the driven element is a turbine having a series of turbine blades.

In a further aspect, the containment vessel is non-rotating.

In an additional aspect, a stator is located between the driving element and the driven element and being supported by the containment vessel.

In still another aspect, a one-way clutch coupling the stator to the containment vessel.

In yet a further aspect, a direct drive element, the direct drive element being configured to connect the output of the prime mover with the input of device to be driven, wherein the direct drive element defines a bypass torque path excluding the driving and driven elements.

In an additional aspect, a first selectable clutch, the selectable clutch being configured to selectably couple the driving element to the output of the prime mover.

In yet another aspect, a second selectable clutch, the second selectable clutch being configured to selectably couple the direct drive element to the input of the driven device.

In still a further aspect, a selectable clutch, the selectable clutch being configured to selectably couple the direct drive element to the input of the driven device.

In an additional aspect, the containment vessel is fixedly connected to a portion of the prime mover.

In another aspect, the containment vessel is fixedly connected to the device to be driven.

In a further aspect, the containment vessel is at least partially defined by portions of the prime mover.

In still an additional aspect, the containment vessel is at least partially defined by portions of the driven device.

In yet another aspect, the containment vessel is partially defined by portions of the prime mover and is partially defined by portions of the driven device.

Further objects, features and advantages of this invention will become readily apparent to persons skilled in the art after review of the following description, including the claims, and with reference to the drawings that are appended to and form a part of this specification.

DETAILED DESCRIPTION

As mentioned above, conventional torque converters employ a rotating shell, defined by front and rear covers, that is directly connected to the prime mover. Internally, the shell includes impeller blades that rigidly attached to the rear cover. When rotated with the rear cover, the shape of the impeller blades cause hydraulic fluid within the shell to be moved radially outward and thereafter thrust against blades of an opposing and rotatably supported turbine. The shape of the turbine blades and the force of the hydraulic fluid imparted upon them induces rotation of the turbine and, subsequently, redirects the hydraulic fluid back towards the impeller blades. The turbine is further mounted to a hub, which is in turn mounted to an input shaft of the device being driven, e.g. the transmission. Thus, rotation of the turbine and hub causes rotation of the input shaft of the transmission. To enable torque multiplication, located between the lower portions of turbine and impeller blades is a stator, which mounted on a one-way clutch. The stator redirects fluid from the turbine so that it is received by the impeller blades without impeding rotation of the impeller blades, thereby resulting in torque multiplication. As seen from the above description, the impeller, turbine and stator define a hydrodynamic coupling or circuit in the torque converter.

Figure 1:
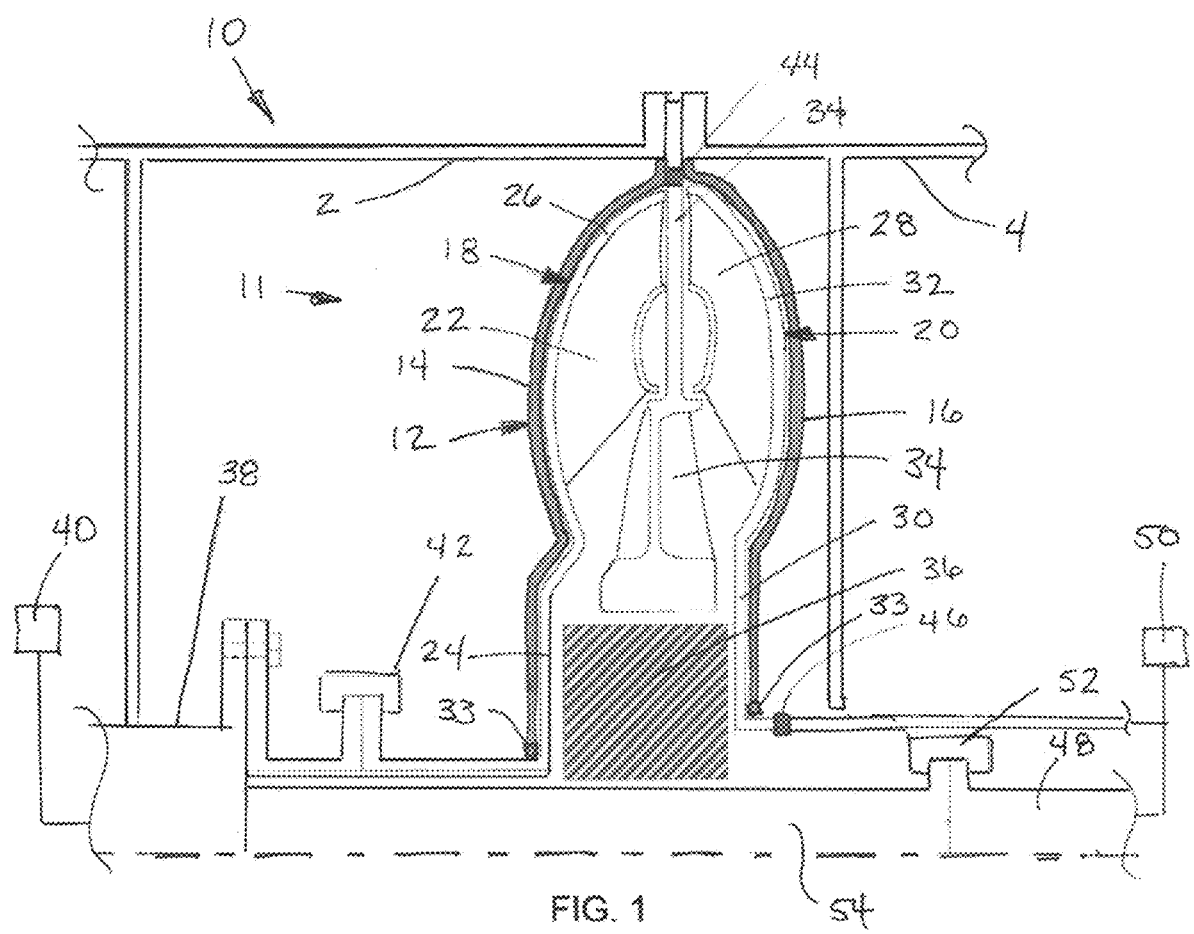
FIG. 1 is a schematic illustration of a launch device embodying the principles of the present invention.

Referring now to the drawings, a launch device embodying the principles of the present invention is generally illustrated in FIG. 1 and designated at 10. The launch device 10 provides for the selective transfer of torque and utilizes a fluid coupling provided by a novel torque converter 11. As disclosed herein, the torque converter 11 excludes a rotating shell and replaces it with a static, non-rotating containment vessel 12.

The containment vessel 12 is a sealed, fluid tight structure, defined by a rigid impeller baffle 14 and a rigid turbine baffle 16, that encases the fluid of the torque converter's hydrodynamic circuit. While shown as being defined by the impeller and turbine baffles 14, 16, the containment vessel 12 may alternatively be defined by the housing or other portions 2 of the prime mover 40, the housing or other portions 4 of the driven device 50, a combination of both of these elements 2, 4 or by a separate construction altogether.

Within the chamber defined by the containment vessel 12 are a driving element (an impeller) 18 and a driven element (a turbine) 20. The impeller 18, being located within the containment vessel 10, and not formed as a part thereof, is not subject to ballooning loads and can be notably lighter in weight than a conventional torque converter's rear cover and its rigidly mounted impeller blades, allowing it to be designed and constructed as a less massive element of the driveline. By removing the shell and its weight from the rotating elements of the driveline, and by providing less massive driving and driven elements, the primary inertia of the powertrain is reduced.

With the present construction, the impeller 18 and turbine 20 rotate within the static containment vessel 12. The impeller 18 includes a plurality of impeller blades 22 supported on an impeller hub 24 by an impeller shell or rings 26. Similarly, the turbine 20 includes a plurality of turbine blades 28 supported on an turbine hub 30 by an impeller shell or rings 32. The impeller hub 24 and turbine hub 30 extend from the containment vessel 12 for respective coupling to output and input members 38, 48 of the prime mover 40 and driven device 50, or to an intermediary device, such as a damper and/or isolator 31. Seals 33 retain the fluid of the hydrodynamic circuit within the inner chamber of the containment vessel 12.

The impeller blades 22 are fluidly coupled to and drive the turbine blades 28 in rotation, which in turn transmits torque to other powertrain system elements, such as a transmission of a motor vehicle. While the impeller 18 and turbine 20 are free to rotate independently of each other within the containment vessel 12, the impeller 18 is coupled to the output member 38 of the prime mover 40, either rigidly or through a clutch 42, as further discussed below.

As mentioned above, conventional torque converters use a stator within the shell, between the impeller and the turbine, to modify the torque transmission characteristics of the torque converter. A conventional stator also utilizes a one-way clutch and reacts against a stator support shaft that is grounded to the body of the power transmission unit.

In the present launch device 10, the containment vessel 12 is fixed and static relative to the rotating elements, the impeller 18 and the turbine 20. As a result, a stator 34 may be grounded off of the containment vessel 12 and the need for a separate support shaft, and it's weight, for the stator 34 is eliminated from the driveline. With the stator 34 grounded off of the containment vessel 12, a conventional one-way clutch located concentrically within the torque converter 10 is also not required. This space, designated at 36 between the impeller 18 and turbine 20, can be used for other purposes, including packaging of a transfer clutch, a disconnect clutch or a damper. The one-way clutch 44 utilized with the stator 34 is therefor also grounded off of the containment vessel 12 and/or other fixed components, such as the engine/motor housing 2 or driven device housing 4.

The turbine 20 is coupled by a one-way clutch 46 to drive the input 48 of the driven device 50.

As briefly noted above, through the use of selectable clutches 42, 52, the prime mover 40 may directly drive the driven device 50 and the hydrodynamic circuit and rotating elements (impeller 18 and turbine 20) of the present torque coupling device 11 may be bypassed, leading to fuel economy gains (or miles per gallon equivalents), efficiency improvements and other benefits resulting from decreased pumping losses. This selectable aspect of the launch device 10 is useful for providing torque multiplication of electric motors during vehicle launch, while providing pass-through torque flow with minimal energy losses upon reaching a threshold where torque multiplication is no longer needed, e.g. a steady cruising speed.

Accordingly, the selectable clutches 42, 52 may be used in concert to operate the driveline in a variety of modes, including full hydraulic launch, parallel launch (torque transfer through the hydraulic circuit of the torque converter with additional clutch-assistance), and direct drive (full bypass of the torque converter's hydraulic circuit).

The selectable clutches 42, 52 may include wet or dry elements. Non-slipping disconnect clutches may also be practical for the facilitation of the present launch device 10.

Figure 2:
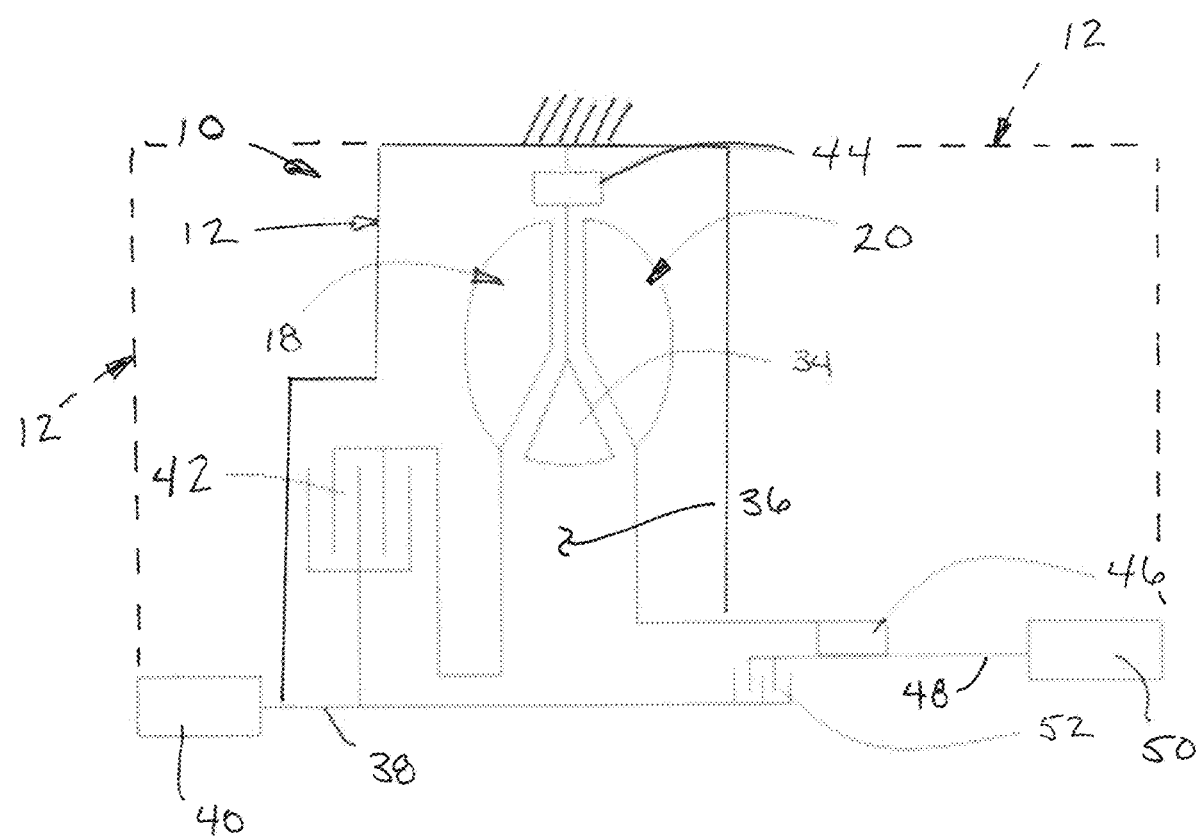
FIG. 2 is a schematic illustration of another launch device embodying the principles of the present invention.
Figure 3:
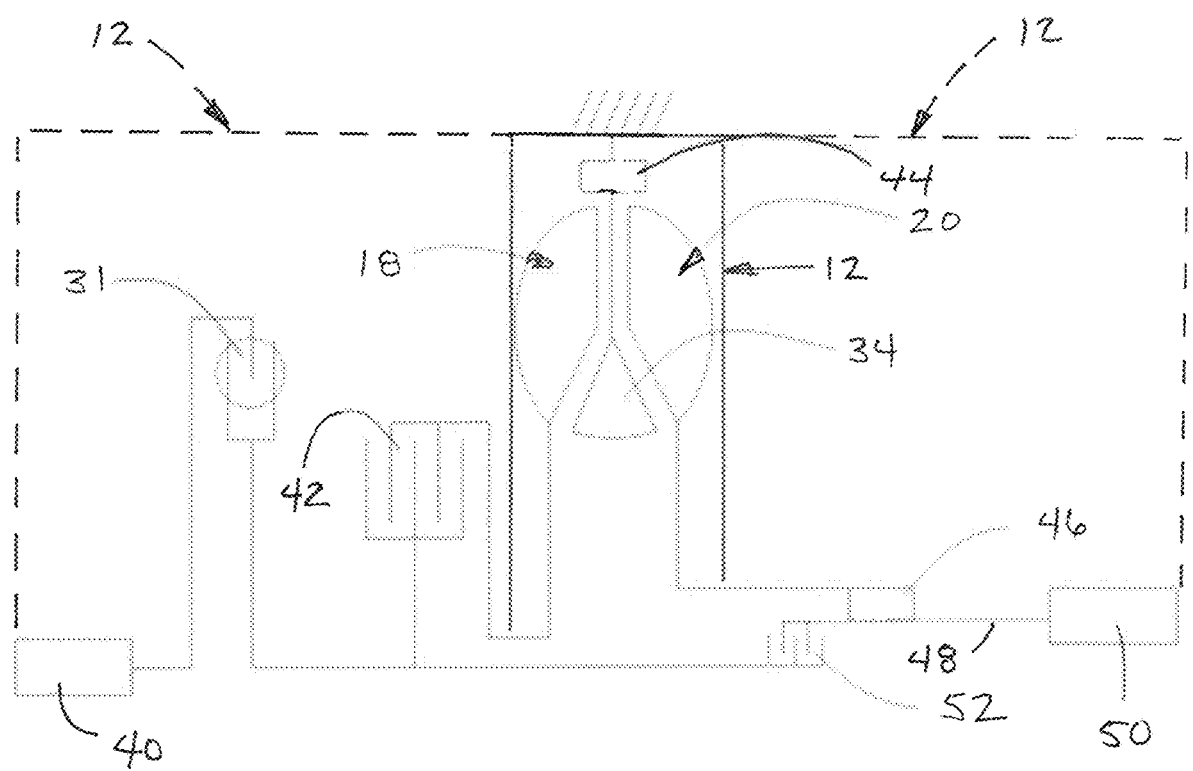
FIG. 3 is a schematic illustration of still another launch device embodying the principles of the present invention.

The selectable clutch, designated at 40, is normally open and may be located between the output member 38 of the prime mover 40 and the input provided by the impeller hub 24. As seen in FIG. 1, this clutch 42 is located outside of the containment vessel 12. The clutch 42 may alternatively be located internally of the containment vessel 12, which is shown in FIG. 2. A second selectable clutch 52 may be located relative to a direct drive shaft 54 connecting the output 38 of the prime mover 40 directly with the input 48 of the driven device 50 (e.g. the transmission).

Provided in this manner, the selectable clutches 42, 52 can be configured to enable a complete bypass of the hydraulic circuit of the torque converter 11. With the second selectable clutch 52 being a normally closed clutch that completes a direct drive connection through the drive shaft 54 and bypasses the hydrodynamic circuit, a command signal (typically hydraulic or pneumatic pressure, or potentially an electromagnetic lock up device) to close the clutch is not required. Considering typical duty cycles in existing torque converters, the majority of miles driven are in a direct drive mode with the clutch applied). Extrapolating to the present launch device 10, with the second selectable clutch 52 being normally closed, the second selectable clutch 52 can provide energy savings by not requiring a parasitic control signal to actuate and close the clutch 52 during the majority of its duty cycle.

As seen from the above discussion, novel features of the present launch device 10 include, without limitation, a non-rotating containment vessel 12, a low inertia impeller 18, an impeller 18 that rotates independently from the containment vessel 12, a stator 34 attached and grounded to the containment vessel 12, and the ability to bypass the hydraulic elements of the system and directly drive the driven device. The present launch device 10 thus also offers the capability of a parallel launch where the fluid coupling is engaged, while the second selectable clutch 52 is allowed to "slip," providing an alternate torque path that augments total torque transfer.

One advantage of the launch device 10 is the reduction in the primary inertia of the driveline, which benefits overall system energy efficiency. Also reduced, and potentially eliminated, is ballooning of the torque converter's containment vessel 12. Reduced or eliminated ballooning may further allow elimination or simplification of system components (i.e. flex plate) that are currently required to accommodate the ballooning effects of contemporary torque converter designs. For engine starting, the reduced primary inertia allows a Belt Starter Generator (BSG) or a Belt Alternator Starter (BAS) system to be used. Finally, with the change from convention mounting of a stator, the launch device 10 is provided with the ability to package a clutch or other components radially inboard of the stator 34, thereby allowing for decrease axial length and an increase in the system's packaging density.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow.

The terminology used herein is therefore intended to be understood in the nature of words of description and not words of limitation.

I claim:

1. A launch device for coupling a rotary output of a prime mover to a rotary input of a driven device, the launch device comprising:
   a non-rotating containment vessel including a front cover and a rear cover, the front and rear covers cooperating to define a fluid tight chamber for a hydrodynamic circuit;
   a driving element configured to be coupled to the rotary output of the prime mover, the driving element located within the fluid tight chamber and being rotatable relative to the containment vessel;
   a driven element configured to be coupled to the rotary input of the device to be driven, the driven element located within the fluid tight chamber and being rotatable relative to the containment vessel;
   wherein the driven element is fluidly coupled to the driving element, forming the hydrodynamic circuit, and is rotationally driven thereby during rotation of the driving element by the prime mover; and
   a stator, the stator being located between the driving element and the driven element and being grounded off of the containment vessel at a location outboard of the driving element and the driven element.

2. The launch device according to claim 1, wherein the driving element is an impeller having a series of impeller blades and the driven element is a turbine having a series of turbine blades.

3. The launch device according to claim 1, further comprising a one-way clutch coupling the stator to the containment vessel.

4. The launch device according to claim 1, further comprising a direct drive element, the direct drive element being configured to connect the rotary output of the prime mover with the rotary input of the device to be driven, wherein the direct drive element defines a bypass torque path excluding the driving and driven elements.

5. The launch device according to claim 4, further comprising a first selectable clutch, the first selectable clutch being configured to selectably couple the driving element to the rotary output of the prime mover.

6. The launch device according to claim 5, further comprising a second selectable clutch, the second selectable clutch being configured to selectably couple the direct drive element to the rotary input of the driven device.

7. The launch device according to claim 4, further comprising a selectable clutch, the selectable clutch being configured to selectably couple the direct drive element to the rotary input of the driven device.

8. The launch device according to claim 1, wherein the containment vessel is fixedly connected to a portion of the prime mover.

9. The launch device according to claim 1, wherein the containment vessel is fixedly connected to the device to be driven.

10. The launch device according to claim 1, wherein the containment vessel is at least partially defined by portions of the prime mover.

11. The launch device according to claim 1, wherein the containment vessel is at least partially defined by portions of the driven device.

12. The launch device according to claim 1, wherein the containment vessel is partially defined by portions of the prime mover and is partially defined by portions of the driven device.

* * * * *